July 14, 1964    K. L. JOHNSON    3,140,738
WELD ELEMENT, METHOD OF MAKING AND UTILIZING IT
Filed Dec. 27, 1960
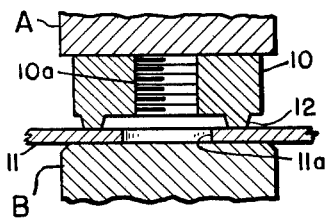
Fig. 1
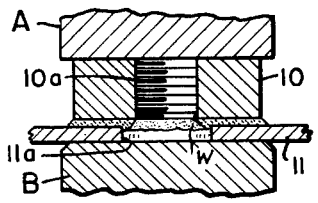
Fig. 2
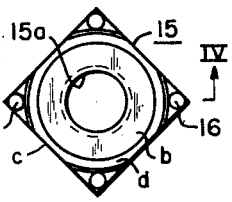
Fig. 3
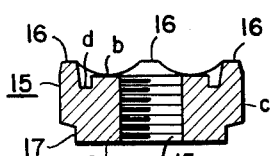
Fig. 4
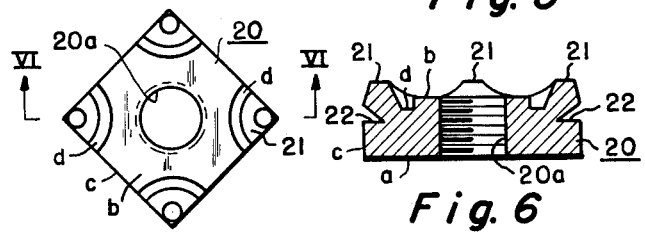
Fig. 5    Fig. 6
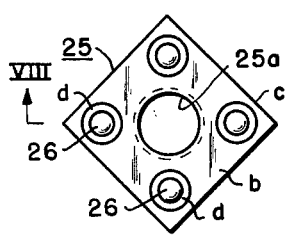
Fig. 7
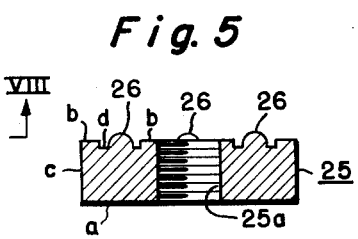
Fig. 8
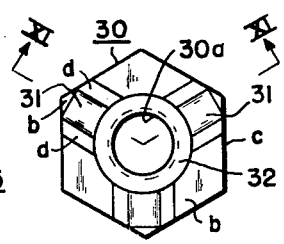
Fig. 9
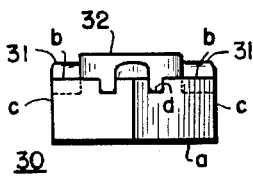
Fig. 10
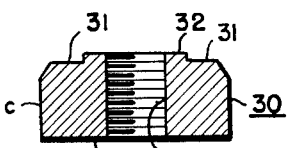
Fig. 11
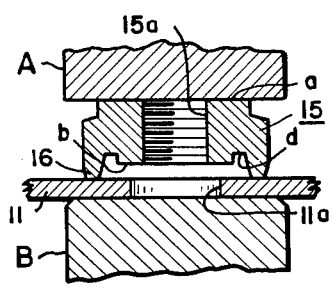
Fig. 12
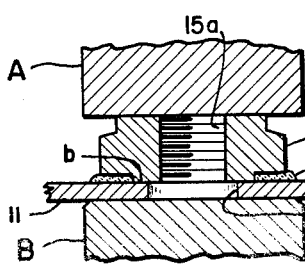
Fig. 13
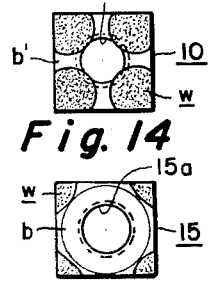
Fig. 14
Fig. 15
INVENTOR.
Kenneth L. Johnson
BY
HIS ATTORNEYS

United States Patent Office 3,140,738
Patented July 14, 1964

3,140,738
WELD ELEMENT, METHOD OF MAKING AND UTILIZING IT
Kenneth L. Johnson, 707 Lowell Ave., Erie, Pa.
Filed Dec. 27, 1960, Ser. No. 78,447
2 Claims. (Cl. 151—41.7)

This invention relates to weld elements such as nuts and to procedure for making them.

A phase of the invention relates to providing and assuring the provision of body metal-to-metal lateral face bearing contacts between a metal weld element and a metal base piece to which the weld element is to be secured by weld projections. Another phase of the invention deals with a weld element or nut that will make possible a substantially 100% face-to-face contact between the element or nut, as welded in place, and the backing member or base metal piece to which it is welded. A further phase relates to the provision of a weld nut that assures a clean thread bore in the nut from the standpoint of weld flash and spatter, and even when the nut is welded under high speed production methods or even somewhat carelessly and without full or proper control of the welding operation.

In the application of weld nuts to sheet metal pieces or parts, difficulty has been experienced in preventing the flow of molten weld metal into the region of the thread bore of the weld nut or, in general, into the bolt hole area of the nut. I have discovered that this difficulty does not arise as much from spattering as is widely believed, but is primarily due to the fact that the mass of metal comprising the weld projections and which is interposed between the body of the weld nut and the sheet metal part or piece to which it is to be applied, in becoming molten during the welding process, is caused to squeeze outwardly in all directions from initial contact areas by the pressure exerted by the welding head of the welding machine.

Heretofore, in spite of an outward spreading of the molten metal, true welding in the sense of a "weld nugget" or alloy of the metal of the two parts being joined, occurs only in a very limited area that is equal to the initial contact area of the welding projections. Although somewhat of a physical bonding is attained in the areas where the molten metal spreads out, I have found that it is insignificant strengthwise in comparison to the smaller, truly welded areas. Some degree of spreading of the molten metal besides being inescapable is necessary for sufficiently welding the areas of initial contact. In this connection, the "puddling" effect accomplished by the spreading of molten metal, aids in the formation of a weld nugget by providing rapid dissipation of heat from the welding area to the surrounding area or mass of metal. This condition is common in varied degrees in employing all presently known types of weld nuts and, disadvantageously, results in some of the metal flowing into the bore area of the nut as well as of the backing member, and in a tendency for it to flow into a portion of the threading area of the nut. This, of course, gives rise to difficulty in utilizing the nut, as welded, when a bolt is to be assembled therewith.

Also, in welding, difficulty has been encountered in connection with the tendency of weld elements or nuts to cock in their as-applied relationship due, at least in part, to uneven sandwiching of the weld metal between the weld face of the elements and the opposed face of the backing piece or member to which they are secured. In fact, I have determined that a clearance spacing is provided between adjacent clean areas of the face of the weld element and the opposed face of the backing piece and that, in the best type of weld nut heretofore employed, the usable bearing area for bolt pressure is in the neighborhood of 20 to 25%. This, in itself, is conductive to cocking, does not develop the maximum strength of the welded-on nut or element and backing piece assembly, and the spacing from weld projections between opposed faces of the weld element and the base member piece serves as a dirt, moisture and treating solution entrapment area when the construction is in use, or its surface is chemically treated for a particular use.

Although the spreading of the molten metal comprising the metal projections is necessary for the attainment of a true weld, the fact that this metal becomes sandwiched between and spaces the body of the weld element or nut and the base metal piece to which it is to be secured, creates many problems, both with regard to the application and the end use of the weld element. The control of the delicate balance of heat and pressure in the welding step must be maintained very close, in order that the spread of the molten metal does not reach the region to the thread bore of the body of a weld nut. Such control is extremely difficult and not uniformly attainable on a production basis, due to many variables that effect it. The condition of the surface to which the weld nut is to be applied, variations in the general form of the welding projections, the condition of the surfaces of the terminals of the welding machine, all have an influence on the "set-down" of the weld nut and upon the degree to which the weld metal of the projections spread-out.

In some cases, weld nuts are being made with a much greater initial contact area and are applied in such a manner that a minimum amount of set-down occurs, in an attempt to combat this difficulty of controlling the spread of molten metal towards and into the threaded bore as well as into the bore of the metal piece to which the weld nut is applied. However, I have determined that true welds cannot be attained by such a procedure, although enough of a mechanical bond may be attained to hold a nut in place until a mating bolt is inserted and tightened-down. Many instances of failure by breaking loose, either at assembly or in service have been encountered, but this has heretofore been accepted as being the lesser of two evils.

As will be apparent, however, a complete securing or set-down of the nut or element body is desirable and in a number of applications, it is absolutely necessary. For example, where the nut is to be used with an embossing type of fastener, such as shown in my pending application Serial No. 67,966 filed November 18, 1960, entitled "Connecting Sheet Material." That is, to obtain a suitable pocket that is formed by applying a weld nut over a much larger bolt hole than is normally used, it is necessary that the weld nut be completely set-down when welded. It is also essential to the proper functioning of an embossing fastener that the pocket thus formed be completely free of any welding metal or flash. This combination of prerequisites is impossible to obtain with any presently known type of weld nut.

It has thus been an object of my invention to solve the problem presented in this connection in the contruction, manufacture, and employment of weld elements;

Another object has been to devise an improved weld element or nut that eliminates the necessity for heretofore intricate controls in the welding operation and, irrespective of this, that makes possible an improved application of the body of the nut to a base metal piece;

Another object of my invention has been to extend the practical field of utilization of weld elements or nuts and particularly, from the standpoint of assuring an effective, permanently-secured joint between a bottom or under side of the element or nut and a base metal piece to which it is applied, while always assuring a clean and undamaged bore in the element body as well as in the base metal piece;

A further object of my invention has been to devise an improved weld element and to employ it in such a manner as to always provide an area of full face-to-face abutment between a bottom or under side of the element body and the base metal piece and, to at all times, assure a full, level and better joint between the element body and the base metal piece;

These and other objects of my invention will appear to those skilled in the art from the disclosure, including the drawings and the description of embodiments thereof.

In the drawings, FIGURES 1 and 2 are illustrative of difficulties heretofore encountered in utilizing and applying conventional weld nuts and thus, may be labeled "old art";

FIGURE 3 is a top plan view and FIGURE 4 is a vertical section along the line IV—IV of FIGURE 3, illustrating an improved weld nut employing the principles of my invention, and in which the upsetting of weld projections is effected by force applied vertically along localized corner areas of a nut blank;

FIGURE 5 is a top plan view and FIGURE 6 is a vertical section along the line VI—VI of FIGURE 5, illustrating a weld nut employing the principles of my invention and whose weld projections are formed by laterally-moving-in upsetting force;

FIGURE 7 is a plan view and FIGURE 8 is a vertical section taken along the line VIII—VIII of FIGURE 7, illustrating another form of nut employing the principles of my invention in which the weld projections are formed by applying force in a vertical plane to the under or bottom side of a nut blank;

FIGURE 9 is a top plan view, FIGURE 10 is a side view in elevation, and FIGURE 11 is a vertical section taken along the line XI—XI of FIGURE 9, illustrating a further type of nut embodying the principles of my invention and which is classified in the art as a pilot type of weld nut wherein, a collar is provided for mounting in an insert relationship in a corresponding hole within the base metal piece;

FIGURES 12 and 13 are somewhat diagrammatic vertical views in elevation illustrating the employment of a weld nut of my invention between opposed welding heads of a welding machine; in this connection, the nut blank illustrated in FIGURES 3 and 4 is employed; FIGURE 12 shows it placed in a ready position for welding with its threaded bore aligned with the bore of the base metal piece, and FIGURE 13 shows it at the completion of a welding operation, as accomplished in accordance with my invention.

And, FIGURES 14 and 15 are reduced bottom plan views showing weld nuts in welded-on positions; FIGURE 14 shows the nut of FIGURE 2 and FIGURE 15 shows the nut of FIGURE 13.

In carrying out my invention, I have devised a weld element or nut and so employ it that the molten metal of its weld projections which are fused during the welding operation, does not space and become sandwiched between the opposed faces of the members, as is inherent in present types of weld nuts. Instead, I freely flow the molten metal to produce a needed "puddling" effect, by the employment of relief or segregating areas about the bases of and between the weld projections and a main abutment face or area. I provide a vertically-inwardly-offset relation of the base of the relief areas, such that secondary face areas are provided that are vertically-inwardly-offset with respect to or spaced behind a primary or abutment face area. In general, I provide limiting metal areas between the weld projections and the central bore of a nut blank, such that the metal flow is controlled in its movement to effect a full-alloying, securing-welding action with the base metal piece, and such that the weld metal does not and cannot spoil a desired, aligned, face-to-face relation between an abutment face area of the weld nut and an opposed face of the base metal piece, and cannot damage or fill the bore of the nut body or of the base metal piece to which the nut body is being secured.

In other words, I provide a gap, grooved, or stand-off, weld-metal collection or pocket area for each of the weld projections. The weld projections, as shown, lie or are located at adjacent corner areas of the nut and are segregated as to molten metal flow from central or bounding face areas of the bore of the nut. In this connection, grooved or vertically-inwardly offset portions are provided in the bottom side of the weld element or nut that define spacing pockets of an area extent or of a molten metal-receiving content or capacity that substantially corresponds to or is preferably slightly greater than the amount of metal that is produced by the melting-down of the weld projections to a plane defined by a surrounding inner, primary or flat abutment face of the nut which is adapted, at the end of the welding operation, to lie in full abutment with an opposed face of the base metal piece to which the nut has been secured.

Referring particularly to FIGURES 1 and 2 of the drawings, which as previously pointed out, are employed to illustrate the difficulties inherent in the use of conventional weld nuts, A and B represent opposed heads of a welding machine which are advanced relatively towards each other to clamp a weld nut 10 upon a base metal piece 11, with the threaded bore 10a of the body of the nut and the bore 11a of the backing or base metal piece in a centrally-axially aligned relation with each other. FIGURE 1 represents a preliminary position which is attained at the start of the welding operation, and FIGURE 2 represents the final position that is attained by the welding machine and the application of welding electric current through its heads A and B, so as to melt-down weld projections 12 of the nut body 10 to form weld metal w, as shown in FIGURE 2, between the nut body 10 and the base metal piece 11.

In this connection (see also FIGURE 14), it will be noted that there is a strong tendency for the molten metal of the weld projections 12 to flow radially-inwardly towards and into the threaded bore 10a as well as into the bore 11b, so as to obstruct them and make it difficult to screw on the conventional bolt. In addition, if the welding pressure is not applied uniformly, if the welding projections are of slightly different height, have a slightly different amount of metal, have slightly different melting characteristics, or if the electric efficiency of the unit is not equal as to all weld projections, then there is a tendency for the nut body 10 to cock with respect to the base metal piece 11. In any event, it will be noted that the weld metal w, in effect, tends to space or offset the two parts or members that are being welded together, such that the lateral face portion b' of FIGURE 14 does not contact but has a vertically-spaced relation with the opposed face of the base metal piece 11 of FIGURE 2. There is a further tendency towards only a mechanical joining of the metal of the nut to the base metal piece, as previously explained.

As distinguished from the above use of a prior art type of weld nut and as illustrated in FIGURES 12 and 13, weld nut 15 (shown in FIGURES 3 and 4) has weld projections 16 which are, in effect, segregated or surrounded between their bases and lateral or radial inner portions of the bottom side or base of the nut by vertical recesses or grooved pocket areas or isolating means d, whose base portions are inwardly-offset with respect to or are behind a substantially flat primary lateral face or bearing surface area b of such under side of the nut. The result, as shown in FIGURES 13 and 15, is that the weld metal w can only flow up to the vertical ledge wall of and within the grooved portion d. That is, the weld metal is limited in its radial-inward flow by vertical abutment face portions of surrounding area metal of the nut, such as represented by the lateral bearing or abutment face b, which, at the finish of the welding operation, is in a face-to-face abutment with the opposite face of the base metal piece 11. When a bolt is mounted on the welded composite structure and drawn or tightened up, the plane-to-plane abutment between the substantially flat bearing face $b$ and the opposed substantially flat face of the base metal piece 11 provides a compression-sealing locking action therebetween that substantially eliminates shearing stress or strain on the bolt, itself, thus providing a much improved type of joint. In this connection, it will be noted that the opposed top lateral face of the base metal piece is undistorted and remains substantially flat after the completion of my type of welding operation.

By thus limiting the area of welding operation and controlling the flow of molten metal, I have been able to provide an alloying action that assures a full and accurate weld-securing of the nut 15 to the metal piece 11, and without any danger of spoiling or clogging the bores 10$a$ and 11$a$ of the two members or elements being secured together into a composite member.

Referring particularly to FIGURES 3 and 4, the weld nut 15 is shown provided with localized or enlarged-point-like vertically-outwardly-extending weld projections 16 which are of rounded and outwardly-converging shape and are each centrally concentrated about an axis that is normal to the surface of article 11, see FIGURE 13. The weld projections may be formed by a vertical punching operation, such as illustrated in my co-pending application filed November 1, 1960, entitled "Making Nuts," Serial No. 66,650. I prefer at the same time and by such an operation to form the grooved portions $d$ which isolate or space the weld projections 16 at the corner areas of the nut from its relatively flat abutment area $b$. In this embodiment, the tips of weld projections 16, are like the tips of the embodiment of FIGURES 5 and 6, shown of relatively flat shape. The weld projections 16 each constitute an extension of a corner of the nut and thus are spaced a maximum distance from the bore 15$a$.

In FIGURES 5 and 6, I have shown a modified form of weld nut 20 constructed in accordance with my invention, whose opposed top and bottom, substantially horizontal sides $a$ and $b$ are connected, as in the embodiment shown in FIGURES 3 and 4, by substantially vertical sides $c$ which define corner areas about the nut. Weld projections 21 are formed by the upsetting metal of the nut body, laterally-inwardly from corner notches 22. Like the embodiment of FIGURES 3 and 4, the under or bottom side $b$ of the nut is defined by an abutment face which surrounds its threaded bore 20$a$ and which segregates recessed or grooved portions $d$ (shown as semi-circular) that extend about the base of each associated weld projection 21. The portions $d$ segregate the weld projections from the inner bounding and bearing area of the nut about its centrally-located bore 20$a$.

In the embodiment 25 of FIGURES 7 and 8, I show weld projections 26 which are shown of knob-like or rounded tip shape, are positioned at slightly inwardly-spaced locations from the corners of the nut, and are surrounded by grooved portions $d$ which lie between such weld projections and the under side $b$ of the nut which also constitutes its abutment or bearing face that surrounds its central threaded bore 25$a$.

In the embodiment of FIGURES 9 to 11, inclusive, a pilot nut 30 has weld projections 31 that extend radially-inwardly from adjacent corners of the nut and terminate at their inner ends at a vertically-upwardly-projecting pilot collar 32 which surrounds its central threaded bore area 30$a$. It will be noted that the weld projections 31 are shown of semi-cylindrical shape having rounded tops and are provided on their opposite sides with a pair of radially-inwardly-projecting recessed or grooved portions $d$ which, at their inner ends, terminate at the collar 32, and at their outer ends, terminate at the vertical sides $c$. In this construction, the under or bottom side $b$ of the nut is primarily defined by substantially flat abutment or bearing areas that lie on the same plane. In this connection, it will be noted that small abutment extension areas $b$ lie between the weld projections 31 and corners of the nut 30. In this construction, the control of the flow of weld metal is accomplished by side-positioned, offset, recessed or grooved pocket areas $d$ that define vertical ledges with corner abutment face portions $b$ and with the collar 32. Employing this type of construction, the collar 32 is adapted to fit in a corresponding recess or hole in the base metal piece, and its face as well as the abutment or bearing face portions $b$ are adapted to lie in an abutting face-to-face relationship with offset opposed faces of the base metal piece, after the welding operation has been completed.

It will be noted from exemplary FIGURE 13 that I have been able to get a substantially 100% face-to-face bearing area between the opposed faces of the nut and the base metal piece, to positively avoid any flow of molten weld metal or flash into bore areas and to control the flow of molten weld metal, so as to localize its flow, at least radially-inwardly of the nut, to maximize and localize the heating-welding action, and accomplish a full alloying action between the metal of the nut and the metal of the base metal piece. No spatter can be produced on thread or bore areas, cocking is eliminated, and the heretofore necessary rigid control as to the welding operation is minimized.

In addition, I have found that I can utilize a greatly enlarged bore in the base metal piece where desired, and can increase the size of the bore of a standard nut where it is desirable, and without danger of damage to such bore areas during the weld-securing operation. By way of example, a $7/16$ inch square nut may be provided with a $5/16$ inch enlarged size bore instead of the conventional $4/16$ inch bore. I find that I can also minimize the welding current to produce a better weld by reason of the localizing of the welding action and thus, avoid distorting or burning the thin base metal piece 11 or producing lumps on its bottom face which normally appear opposite the weld projections of the nut. The face-to-face full abutment between non-welded portions of the nut body and the base metal piece, not only is indicative of prevention of flow of weld metal into adjacent bore areas, but insures a fully planar, non-cocked, secured-on relation of the weld nut, without deforming the base metal piece.

It will be noted that the welding projections of the improved nut of my invention project at their bases from a secondary surface, as defined by the base of the offset pocket portions $d$. The base of each grooved portion $d$ is on a lower level of the vertical thickness of the body of the nut than the primary abutment or bearing face $b$ on its welding or bottom side or, in other words, is located on a lower lateral plane than or behind surrounding metal areas of such side of the nut. Instead of sandwiching, the molten metal flows freely in a puddling action to fill-up the gap thus provided.

It will be seen that the welding projections, when fused, flow molten metal into the relief areas until the bearing areas $b$ of the nut are moved into close bearing abutment with the opposed face of the base metal piece 11. A 100% set-down of the weld nut is attained with no spacing-sandwiching of weld metal between the weld nut and the metal base piece to which it is attached. The danger of molten metal flowing into the region of the bores is completely eliminated.

Although the general configuration of the welding projections is not controlling or the manner in which they are formed, I have shown, by way of example, how the principles of my invention may be adapted to elements or nuts formed in different manners and to elements or nuts of different types. The weld nut illustrated by FIGURES 3 and 4 may be manufactured directly from flat wire on a cold punch nut machine or by processing standard stove nuts. In either case, the weld projections are formed by displacing metal at the corners, and the secondary face $b$ is obtained by an annular ring-like configuration in the die complementary to the desired shape of such area.

The weld nut of FIGURES 5 and 6 may be made by processing a standard stove nut blank by indenting its corners at 22 to strike-up the weld projections 21. In producing a nut of this type, I have found it is advantageous to form the secondary area b on the face of the stove nut first, and then to strike up the weld projections 21, so that they project beyond the areas b.

In the form of nut shown in FIGURES 7 and 8, I have incorporated the principles of my invention with a button-like weld type of projection that protrudes directly from the welding face. Due to the high forging force required to form this type, it may be manufactured in a modern type of automatic nut former. The secondary or offset or grooved areas d from which the welding projections 26 originate may be in the form of annular, ring-like depressions surrounding each projection. The relief thus afforded the metal when it becomes molten is ample to accommodate it to permit a 100% set-down of the nut body with respect to the metal base piece 11.

The pilot type of nut shown in FIGURES 9 to 11, inclusive, employs a collar or pilot collar 32 that is adapted to fit into a bolt hole to which it is applied. It will be noted that this collar 32 projects from the primary abutment face b somewhat more than the welding projections 31, so that it will be partly entered into the bolt hole at the start of the welding operation when the points of the weld projections are touching the surface of the base metal piece surrounding the hole. The collar 32 serves to locate the weld nut over the hole and to prevent flow of weld metal into its threaded bore.

In present types of pilot welding nuts, the projections are interposed between the plane of the primary under side and the surface to which the nut is applied, and therefore become sandwiched between them when the nut is applied, preventing a 100% set-down. If an increased welding pressure is used to provide a maximum possible set-down, the metal comprising the welding projections is squeezed outwardly beyond the periphery of the nut to provide an unsightly welding flash; if this were not done, it would become difficult to set the nut on the surface. However, applying the principles of my invention to this type of nut, the secondary plane represented by the base of the offset portions d and from which the base of each associated welding projection 31 protrudes, does not have to completely surround the welding projections, since the pilot collar 32 serves as an upper level barrier in the region of the threaded bore.

In addition to extending the field of utilization of weld nuts, as intimated above, I minimize the requirements of control of the factors of force, time and current pertinent to a welding process. The 100% set-down of the weld nut on the base metal piece insures that it sets squarely on the surface to which it is applied. A much lower welding force may be used, since the need to squeeze sandwiched metal out as flat as possible is eliminated.

In employing conventional weld nuts, it has been desirable to attain a high degree of fluidity in the molten metal to facilitate its being squeezed out between the opposed metal surfaces. I have determined that with weld nuts of my invention, less than one-half the commonly used amount of both welding force and current for a given size and shape of nut may be used. For example, a normal nut of a size of 9/16 of an inch square requires about 9000 to 9500 amperes current and a pressure of about 600 to 700 pounds, as compared to about 4500 amperes and about 325 pounds employing my tpye of weld nut. The time for both types of welding operations is about the same or 7/60 of a second. Another advantage of my invention is that where thick weld nuts are to be applied to a thin metal sheet, there is a materially lessened danger of burning or warping the base metal piece. In addition, a superior welding is obtained which provides a puddling effect and a sound weld nugget.

In weld-mounting or securing a weld element to a base metal piece, it will be noted that I apply opposed welding heads A and B (which may be of opposite electric current potential), respectively, to the outer sides of the weld element or member and the base metal piece or member. During the application of a continued, relative axial-inward pressure, as effected by such weld heads, I progressively melt down weld metal projection means of the weld element and move the inner side of the weld element body towards the inner side of the base metal piece and continue this application of force and melting current, until the contour of a lateral abutment face of the weld element body is in close bearing abutment with the contour of the opposed lateral face of the base metal piece. During this operation, the flow of weld metal from the weld projection means is positively restrained from lateral flow upon or along the abutment face of the weld element body; it is restrained from inward-lateral or radial flow upon a lateral face area surrounding the bore hole of a nut body.

Although I have, for the purpose of illustration and by reason of the importance of a weld nut application of my invention, shown it as thus-applied, it will be apparent to those skilled in the art that the principles of the invention may be applied to other weld elements and particularly, where as in the case of weld nuts (or more generally to weld elements that have substantially polygonal-sided bodies with defined corners) it is, as I have found, desirable to provide metal-to-metal bearing face engagement between the body of the weld element member and the body of the base metal member, to avoid burning or distorting the base metal member from a substantially flat or desired initial contour, to obtain an improved weld joint, or to control the flow of weld metal provided by a weld projection in such a manner as to avoid sandwiching or spacing of opposed faces of the members being joined and provide an improved alloying-welding action between such members.

What I claim is:

1. An improved weld nut of the type that is to be weld-secured to a surface of a metal article; said weld nut comprising, a substantially square body portion having an integral side for cooperating with the metal article, and having a central threaded bore extending therethrough and intersecting said integral side, said side comprising:

(A) a single, continuous, substantially planar bearing surface that completely surrounds said central threaded bore, (B) a weld projection located at each of the four corners of said substantially square body portion and extending outwardly beyond the plane of said bearing surface, and (C) metal receiving groove means positioned between each of said weld projections and said bearing surface, the volume of said groove means being at least equal to the volume of that portion of said projections that extends beyond the plane of said bearing surface, said groove means being associated with each of said weld projections and extending across the corners of said body portion from one peripheral edge of said side to the adjacent edge to effectively isolate said bearing surface from all of said weld projections.

2. An improved weld nut of the type that is to be weld-secured to a surface of a metal article; said weld nut comprising, a substantially square body portion having an integral side for cooperating with the metal article, and having a central threaded bore extending therethrough and intersecting said integral side, said side comprising:

(A) a substantially planar circular bearing surface completely surrounding said central threaded bore for contiguously receiving and providing the entire bearing contact with, the article surface, (B) four weld projections, each formed as an extension of the corners of the substantially square body portion and extending outwardly beyond the plane of said bearing surface, and (C) metal receiving groove means having a volume at least equal to the volume of that portion of said projections that extends beyond the plane of said bearing surface, said groove means bounding said substantially circular bearing surface by extending at least across each of the corners of said side from one peripheral edge to the adjacent edge to effectively isolate said bearing surface from each of said weld projections.

References Cited in the file of this patent

UNITED STATES PATENTS

| | | |
|---|---|---|
| 2,372,772 | Ellis | Apr. 3, 1945 |
| 2,761,483 | Richardson | Sept. 4, 1956 |
| 2,784,758 | Rohe | Mar. 12, 1957 |

FOREIGN PATENTS

| | | |
|---|---|---|
| 775,724 | Great Britain | May 29, 1957 |